United States Patent Office 3,443,134
Patented May 6, 1969

3,443,134
HOMOPOLAR DYNAMOELECTRIC MACHINE
Brian O. Dowsett and Anthony D. Appleton, Newcastle-upon-Tyne, England, assignors to International Research & Development Company Limited, Fossway, Newcastle-upon-Tyne, England
Filed Feb. 28, 1966, Ser. No. 530,442
Claims priority, application Great Britain, Mar. 9, 1965, 10,062/65
Int. Cl. H02k 31/02
U.S. Cl. 310—178         12 Claims

ABSTRACT OF THE DISCLOSURE

A homopolar machine having superconducting field coils is disclosed in which the rotor is of disc form and in a preferred construction has two conducting discs mounted on opposite sides of a support disc. A screening coil, also superconducting, can be arranged outside the annular field coil which surrounds the rotor.

---

This invention relates to homopolar dynamoelectric machines.

According to the invention a homopolar dynamoelectric machine includes a rotor having at least one conducting path for electric current, a stator having super-conducting coils providing a magnetic field which is cut by the conducting path upon rotation of the rotor, and means for transferring current between the conducting path and an external circuit.

The rotor may take the form of a disc or drum or a plurality of discs or drums mounted on a common shaft. The super-conducting coils preferably surround the periphery of the rotor and are co-axial with it.

The whole of the rotor may be an electrically-conducting body or it may be of non-conducting material supporting electrically-conductive material providing the current path or paths.

The means for transferring current between a conducting path and external source of supply may be of the solid contact or liquid contact type. In the case of the solid contact type the current transfer may be through brushes and slip rings and in the liquid contact type between a solid contact and a liquid contact for example mercury.

A dynamoelectric machine in accordance with the invention may be used as a generator, supplying current to the external circuit upon rotation of the rotor, or as a motor, producing rotation of the rotor when current is supplied by the external circuit.

Figure 1:
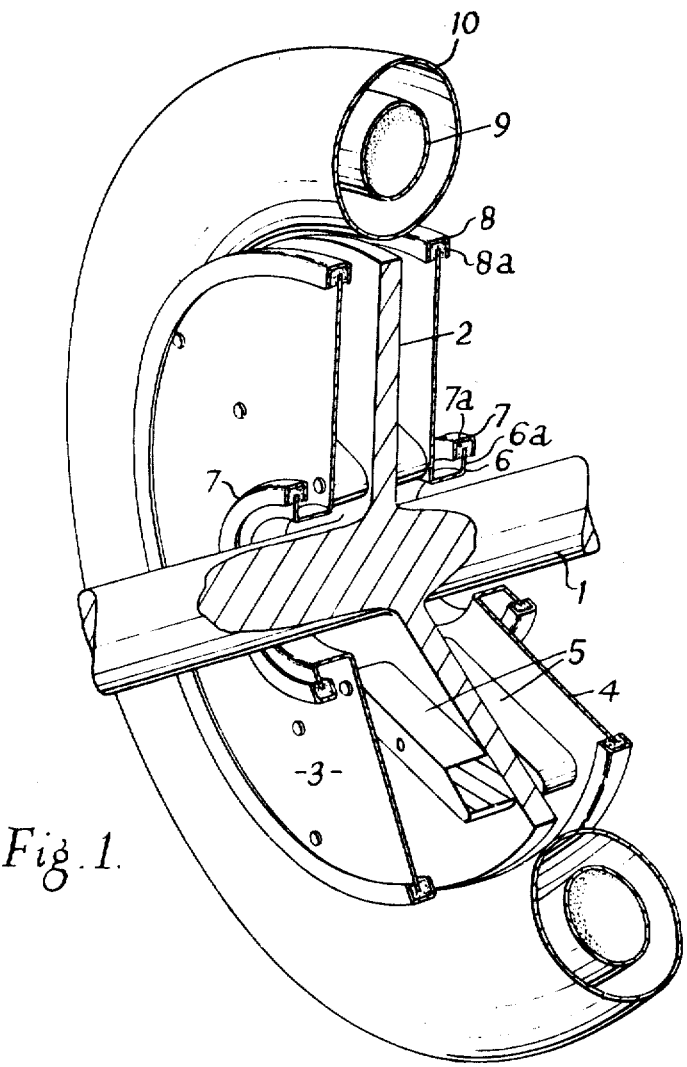
Figure 2:
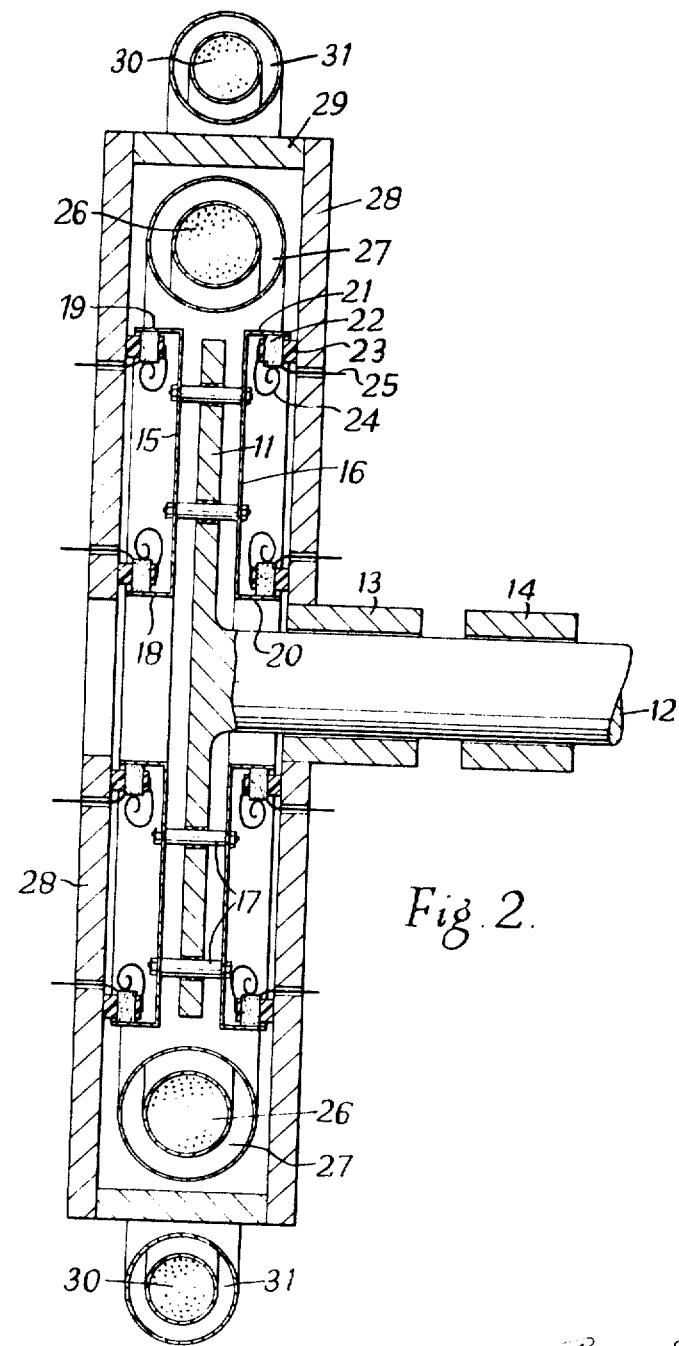

The invention will now be described in more detail with the aid of examples illustrated in the accompanying drawings in which:

FIG. 1 shows a partially-sectioned view in perspective of a homopolar motor in accordance with the invention, and FIG. 2 shows a diagrammatic section of a second form of homopolar machine in accordance with the invention.

Referring first to FIG. 1, the motor has a steel rotor shaft 1 carrying an integral support disc 2. Discs 3 and 4 of electrically-conducting material are mounted on opposite sides of the disc 2 by means of insulating spacers 5. The spacers 5 are shaped to form fan vanes to assist the circulation of cooling air over the faces of the discs 3 and 4 as the rotor rotates.

Each of the discs 3 and 4 has a central aperture bounded by a cylindrical wall 6 integral with the disc. The outer edge of the wall 6 is bent outwards at 90° to form a radially-extending ring contact element 6a. The contact rings 6a are surrounded by channel-shaped members 7 having solid contacts 7a therein which engage the contact ring 6a to establish electrical contact between the rotor and an external current supply source. Members 8, similar in construction to the members 7 and containing solid contacts 8a, surround the peripheries of the discs 3 and 4 and the contacts 8a make electrical contact with the peripheries of the discs. Direct current can thus be passed through the discs in a radial direction from the contact 7a to the contact 8a.

The stator of the motor comprises a fixed coil 9 formed of a number of turns of superconducting wire disposed co-axially about the periphery of the rotor. The coil 9 is located in an annular cryostat 10 which in conventional manner maintains the coil at the low temperatures necessary for super-conductivity.

The passing of direct current through the coil 9 produces an intense magnetic field, the lines of force of which pass through the discs in a direction substantially parallel to the axis of rotation of the discs. When direct current is passed through the discs rotation is set up in the rotor and the machine acts as a motor. Conversely, if the rotor is driven a current is generated in the discs and the machine can be used as a generator. It may also be adapted for use as an electro-magnetic brake.

While in the machine described above, current is transferred between the disc and the external circuit by rubbing contact between the rotating disc and the fixed solid contacts, other methods may be used. For example, the channel members 7 and 8 may contain a conductive liquid such as mercury which is retained by suitable sealing means. Conventional contact brushes may also be used.

The machine shown in section in FIG. 2 has a disc rotor 11 mounted on a rotor shaft 12 which is overhung by arranging shaft bearings 13 and 14 on the same side of the disc. This bearing arrangement facilitates assembly of the machine. The rotor 11 carries discs 15 and 16 of electrically-conducting material which are attached to the rotor 11 by insulating bolts 17. The disc 15 has inner and outer cylindrical flanges 18 and 19 respectively and the disc 16 has corresponding flanges 20 and 21. Each of the flanges 18 to 21 is in engagement with a series of brushes 22 arranged around the flange. Each brush 22 is carried by a bracket 23 and biassed into engagement with the flange by a constant force spring 24. It is connected to the external circuit in conventional manner by a lead 25.

As in the construction of FIG. 1 a super-conducting coil 26 is arranged around the periphery of the rotor with a cryostat 27. In this machine ferromagnetic pole-pieces 28 are arranged on either side of the rotor in planes parallel to the plane of the support disc 11. The ferro-magnetic material forms only a small part of the magnetic circuit. Since the superconducting coil 26 provides a very high magnetising field the material of pole pieces 28 is in a saturated state and the relative permeability is greater than unity. There is therefore a considerably higher flux density in the ferro-magnetic material than that which would exist in air alone for the same magnetising force, and the present invention makes use of this effect to boost the field in the vicinity of the pole-pieces due to the superconducting coil.

Pole-pieces for the purposes described may assume a variety of shapes depending in part upon the geometry of the super-conducting coil. In the machine shown in FIG. 2, the pole-piece 28 essentially comprise discs of solid ferro-magnetic material placed coaxial with the motor rotor in planes which are parallel to the rotor. In some applications, pole-pieces constructed of a number of sections of ferro-magnetic material may be used.

The distance between the discs may be optimised to give the maximum boost in magnetic field strength at the periphery of the machine rotor 11. In general, the optimum distance is small, and it is therefore necessary to provide spacers 29 between the pole-pieces, as shown, in order to ake up the high force of attraction which is developed between them. The spacers 29 may be of magnetic or non-magnetic material.

In order to reduce the magnitude of the magnetic field strength in regions where the magnetic field is not usefully employed, a superconducting screening coil or coils may be used. FIG. 2 shows, for example, a super-conducting screening coil 30, within a cryostat 31 which serves to reduce the effect of the magnetic field of the super-conducting coil 26 external to the machine. Such a screening coil may be required to diminish interference with any equipment situated in the vicinity of the machine.

The super-conducting screen coil or coils may be completely sealed with no external connections and receive current through the medium of the mutual inductance with the main field coil.

In another embodiment the disc or discs may be of non-electrically-conducting material and have current-carrying members formed thereon or attached thereto.

Instead of a rotor comprising one or more discs a drum-type rotor may be used and the rotor may be cylindrical in form or have other shapes such as a conical or truncated conical shape.

In the case of the disc type rotor the discs may be flat or dish-shaped.

The current supply for the machine when used as a motor may be derived from a similar machine operated as a generator.

Alternatively, the current supply for the machine when used as a motor may be derived from a magnetohydrodynamic generator.

We claim:
1. A homopolar electrical machine including a rotor having at least one conducting path for electric current, a stator having superconducting coils providing a magnetic field which is cut by the conducting path upon rotation of the rotor, said stator having a cryostat enclosing said super-conducting coils to maintain them in super-conducting state, and means for transferring current between the conducting path and an external circuit.

2. A machine as claimed in claim 1 including bodies of magnetic material interposed in the magnetic field produced by the super-conducting coil to concentrate said field in selected regions.

3. A machine as claimed in claim 1 in which the means for transferring current comprises solid brushes in contact with slip rings connected to the conducting path.

4. A machine as claimed in claim 1 comprising super-conducting screening coils arranged to reduce the magnetic field in selected regions and cryostat means enclosing said screening coils to maintain them in super-conducting state.

5. A homopolar electrical machine as claimed in claim 1 in which the rotor comprises at least one disc of electrically-conducting material.

6. A machine as claimed in claim 5, including a support disc on which the disc of electrically-conducting material is mounted.

7. A machine as claimed in claim 6 including a second electrically-conducting disc mounted on said support disc on the opposite side thereof to the first said disc.

8. A machine as claimed in claim 6 in which the disc of electrically-conducting material is mounted on the support disc by way of electrically-insulating spacing members.

9. A machine as claimed in claim 8 in which the spacing members are shaped to assist circulation of cooling gas over the surface of the discs.

10. A machine as claimed in claim 5 including bodies of magnetic material disposed in planes substantially parallel to the plane of said electrically-conducting disc to concentrate the magnetic field of the super-conducting coil in the region of said disc.

11. A machine as claimed in claim 5 in which the electrically-conducting disc has an axially-extending peripheral flange and the means for transferring current comprise solid conducting brushes in contact with the inner face of the said flange.

12. A homopolar electrical machine including a rotor in the form of at least one pair of discs of electrically-conducting material mounted for rotation on a common shaft, each disc of a pair being insulatedly mounted on a common support disc but spaced therefrom, there being a disc on each side of the support disc, spacing members in the spaces between each disc and its support member, a super-conducting coil disposed around the periphery of the rotor, discs of magnetic material disposed on the side of each electrically-conducting disc remote from the support disc, further spacing members located between the discs of magnetic material to hold them apart axially, a further super-conducting coil acting as a screening coil surrounding the first-mentioned coil, and cryostat means enclosing said super-conducting coils to maintain them in super-conducting state.

References Cited
UNITED STATES PATENTS

| | | | |
|---|---|---|---|
| 3,185,877 | 5/1965 | Sears | 31—178 |
| 3,242,418 | 3/1966 | Mela et al. | 310—52 |
| 3,261,210 | 7/1966 | Buchhold | 308—10 |
| 3,368,087 | 2/1968 | Madsen | 310—52 |

MILTON O. HIRSHFIELD, Primary Examiner.

L. L. SMITH, Assistant Examiner.

U.S. Cl. X.R.

310—52